(12) United States Patent
Bowers et al.

(10) Patent No.: US 10,883,790 B2
(45) Date of Patent: *Jan. 5, 2021

(54) CROSSBOW SAFETY SYSTEM

(71) Applicant: Hunter's Manufacturing Company, Inc., Suffield, OH (US)

(72) Inventors: Drew Bowers, Kettering, OH (US); Cassondra Faiella, Lewis Center, OH (US); Michael J. Shaffer, Mogadore, OH (US); Richard L. Bednar, Akron, OH (US)

(73) Assignee: Hunter's Manufacturing Co., Inc., Suffield, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/450,037

(22) Filed: Jun. 24, 2019

(65) Prior Publication Data
US 2019/0310048 A1  Oct. 10, 2019

Related U.S. Application Data

(63) Continuation of application No. 15/894,275, filed on Feb. 12, 2018, now Pat. No. 10,330,426.
(Continued)

(51) Int. Cl.
*F41B 5/12* (2006.01)
*F41A 17/06* (2006.01)
(Continued)

(52) U.S. Cl.
CPC ................ *F41B 5/12* (2013.01); *F41A 17/06* (2013.01); *F41A 17/22* (2013.01); *F41B 5/123* (2013.01);
(Continued)

(58) Field of Classification Search
CPC .................................. F42B 5/12; F42B 5/123
See application file for complete search history.

(56) References Cited

U.S. PATENT DOCUMENTS 2,092,361 A  9/1937 Shim
3,043,287 A  7/1962 Nelson
(Continued)

OTHER PUBLICATIONS

A Guide to the Crossbow, by W.F. Paterson, published by the Society of Archer-Antiquaries, 1990.
(Continued)

*Primary Examiner* — John A Ricci
(74) *Attorney, Agent, or Firm* — Emerson Thomson Bennett, LLC (57) ABSTRACT

Provided is a crossbow safety system comprising a crossbow, optic fence, and interlock. The crossbow may have a bowstring operable between a cocked and an uncocked position, the cocked position and the uncocked position defining between them a bowstring plane, and a trigger assembly adapted to selectably retain the bowstring in the cocked position. The optic fence may be adapted to detect an obstruction in a safety plane coincident with the bowstring plane or offset below the bowstring plane by some offset distance. The optic fence may have an infrared emitter adapted to output IR radiation, and a photodiode adapted to sense the output IR radiation from the infrared emitter. The interlock may be operationally engaged with the optic fence and the trigger assembly. The interlock may be adapted to lock the trigger assembly from releasing the bowstring if the optic fence detects an obstruction in the safety plane.

20 Claims, 5 Drawing Sheets

Related U.S. Application Data (60) Provisional application No. 62/478,306, filed on Mar. 29, 2017.

(51) Int. Cl.
  *F41A 17/22* (2006.01)
  *G01V 8/14* (2006.01)
  *G01V 8/20* (2006.01)
  *G01V 8/22* (2006.01)
  *G01S 17/04* (2020.01)

(52) U.S. Cl.
  CPC ............... *G01S 17/04* (2020.01); *G01V 8/14* (2013.01); *G01V 8/20* (2013.01); *G01V 8/22* (2013.01)

(56) References Cited

U.S. PATENT DOCUMENTS

| | | |
|---|---|---|
| 3,561,419 A | 2/1971 | Cucuzza, Sr. |
| 3,670,711 A | 6/1972 | Firestone |
| 3,739,765 A | 6/1973 | Moore |
| 4,192,281 A | 3/1980 | King |
| 4,246,883 A | 1/1981 | Ash |
| 4,593,675 A | 6/1986 | Waiser |
| 4,603,676 A | 8/1986 | Luoma |
| 4,649,892 A | 3/1987 | Bozek |
| 4,662,345 A | 5/1987 | Stephens |
| 4,665,885 A | 5/1987 | Glomski et al. |
| 4,719,897 A | 1/1988 | Gaudreau |
| 4,721,092 A | 1/1988 | Waiser |
| 4,942,861 A | 7/1990 | Bozek |
| 5,115,795 A | 5/1992 | Farris |
| 5,205,267 A | 4/1993 | Burdick |
| 5,215,069 A | 6/1993 | Liu |
| 5,220,906 A | 6/1993 | Choma |
| 5,243,956 A | 9/1993 | Luehring |
| 5,433,186 A | 7/1995 | Corwin |
| 5,437,260 A | 8/1995 | King |
| 5,445,139 A | 8/1995 | Bybee |
| 5,553,596 A | 9/1996 | Bednar |
| 5,598,829 A | 2/1997 | Bednar |
| 5,649,520 A | 7/1997 | Bednar |
| 5,678,528 A | 10/1997 | Hadley |
| 5,853,001 A | 12/1998 | Vyprachticky |
| 5,987,724 A | 11/1999 | Kleman |
| 6,095,128 A | 8/2000 | Bednar |
| 6,286,496 B1 | 9/2001 | Bednar |
| 6,874,491 B2 | 4/2005 | Bednar |
| 6,913,007 B2 | 7/2005 | Bednar |
| 7,100,590 B2 | 9/2006 | Chang |
| 7,178,514 B2 | 2/2007 | Chang |
| 7,624,725 B1 | 12/2009 | Choma |
| 7,784,453 B1 | 8/2010 | Yehle |
| 8,443,790 B2 | 5/2013 | Pestrue |
| 8,499,753 B2 | 8/2013 | Bednar |
| 9,234,719 B1 | 1/2016 | Kempf |
| 10,330,426 B2 * | 6/2019 | Bowers ................ G01S 17/04 |
| 2006/0086346 A1 | 4/2006 | Middleton |
| 2010/0170488 A1 | 1/2010 | Rasor et al. |
| 2011/0056467 A1 | 3/2011 | Popov et al. |

OTHER PUBLICATIONS

European Crossbows, a Survey by Josef Alm, copyrighted by the Trustees of the Royal Armouries and the Arms and Armour Society, 1994.
The Book of the Crossbow, by Ralph Payne-Gallwey, published by Dover Publications, Inc. of New York, 1995.

* cited by examiner

CROSSBOW SAFETY SYSTEM

CROSS-REFERENCE TO RELATED APPLICATIONS

This application is a continuation of U.S. patent application Ser. No. 15/894,275, filed Feb. 12, 2018, which claims the benefit of U.S. Provisional Application No. 62/478,306, filed Mar. 29, 2017, the entirety of each of which are fully incorporated by reference herein.

BACKGROUND

The present subject matter is directed to crossbows. More specifically the present subject matter is directed to an interlock system for a crossbow to prevent unsafe operation.

There are multiple technical challenges present in current crossbow technology. Some of these challenges relate to user safety and satisfaction. Unlike some other conventional weapons, a crossbow may present an opportunity for a user to grip the weapon in a way that positions a body part, such as the user's finger or other portion of the user's hand, in the path of the bowstring of the crossbow as it moves from the cocked to the uncocked positions during firing. Such positioning of a body part in the path of the bowstring may lead to undesirable performance and potential user injury.

It remains desirable to provide an interlock system for a crossbow that helps to prevent unsafe or otherwise undesirable operation.

SUMMARY

In accordance with one aspect of the present subject matter provided is a crossbow safety system comprising a crossbow, optic fence, and interlock. The crossbow may have a bowstring operable between a cocked and an uncocked position, the cocked position and the uncocked position defining between them a bowstring plane, and a trigger assembly adapted to selectably retain the bowstring in the cocked position. The optic fence may be adapted to detect an obstruction in a safety plane coincident with the bowstring plane or offset below the bowstring plane by some offset distance. The optic fence may have an infrared emitter adapted to output IR radiation, and a photodiode adapted to sense the output IR radiation from the infrared emitter. The interlock may be operationally engaged with the optic fence and the trigger assembly. The interlock may be adapted to lock the trigger assembly from releasing the bowstring if the optic fence detects an obstruction in the safety plane.

Still other benefits and advantages of the present subject matter will become apparent to those skilled in the art to which it pertains upon a reading and understanding of the following detailed specification.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION

Figure 1:
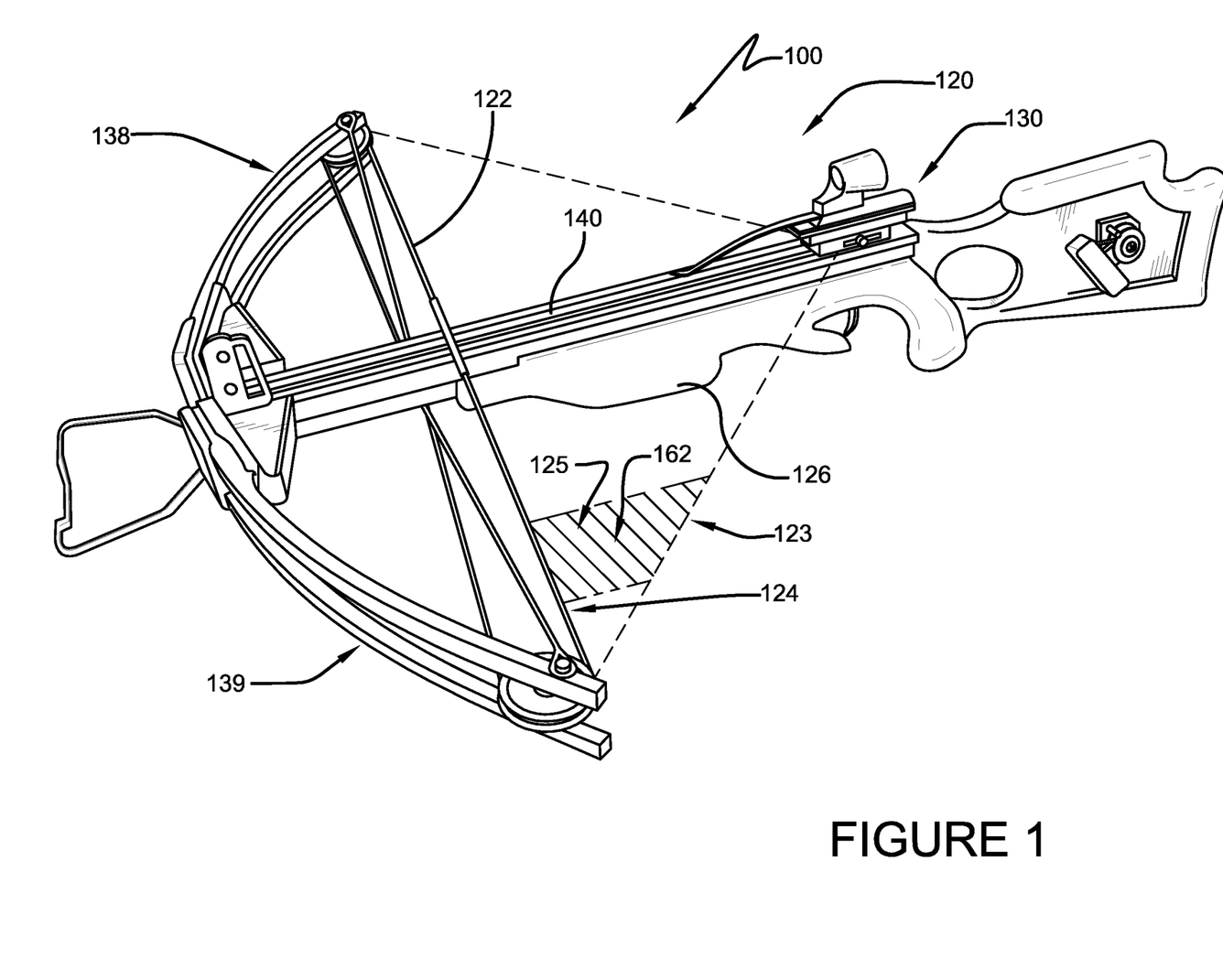
FIG. 1 is a perspective view of one embodiment of a crossbow safety system.
Figure 2:
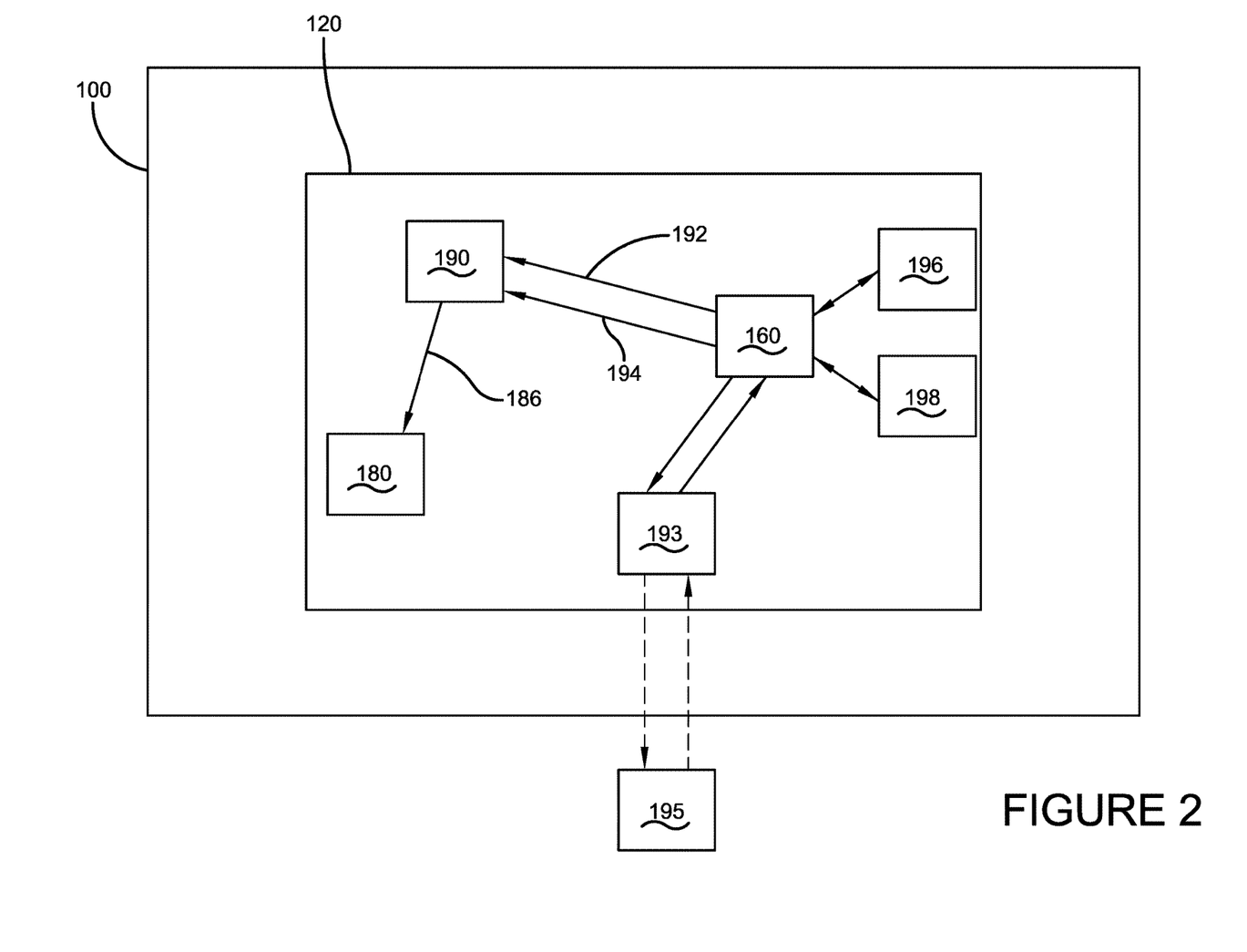
FIG. 2 is a schematic diagram of the components in one embodiment of a crossbow safety system.
Figure 3:
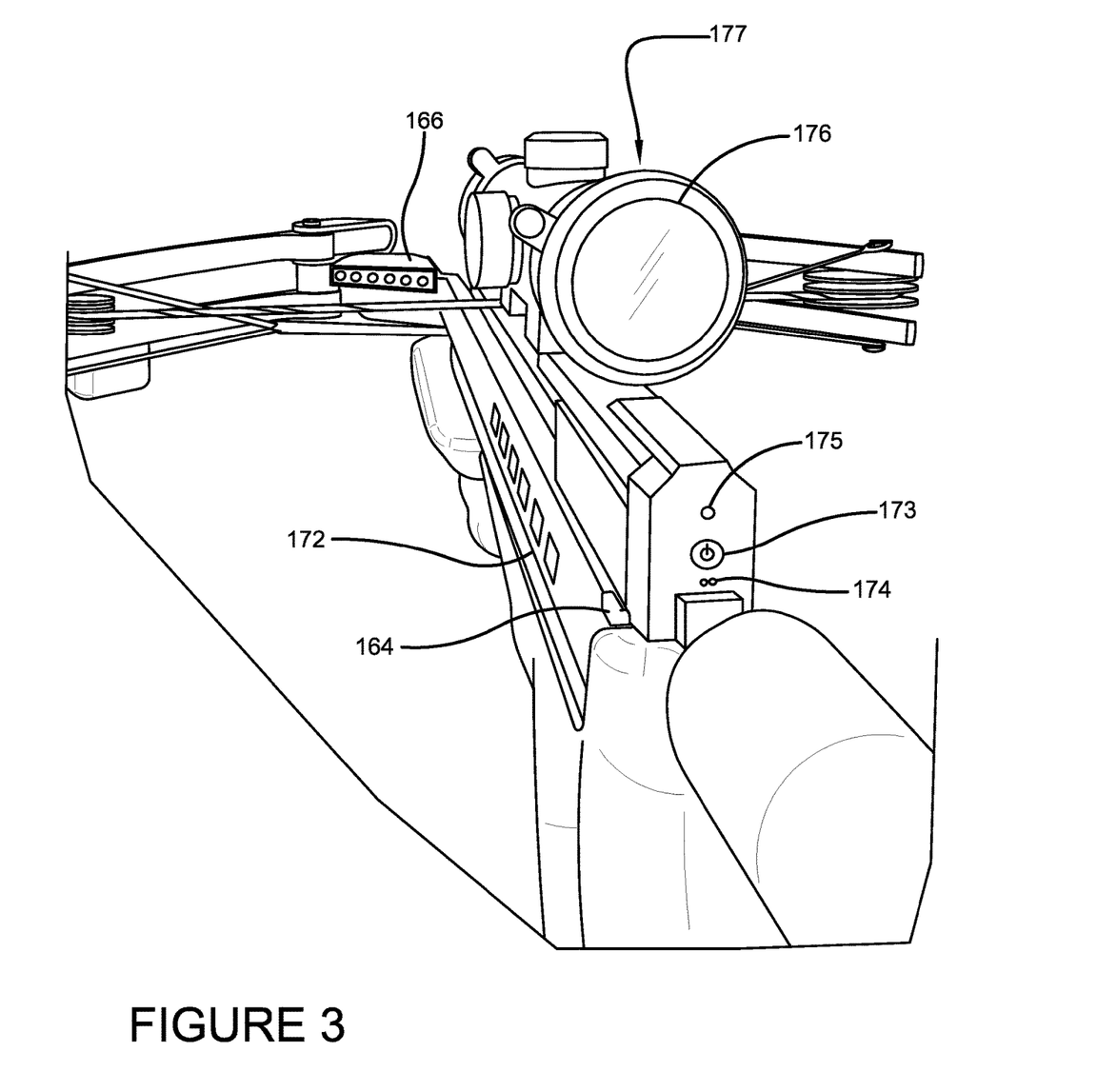
FIG. 3 is a perspective view of one embodiment of a crossbow safety system.
Figure 4:
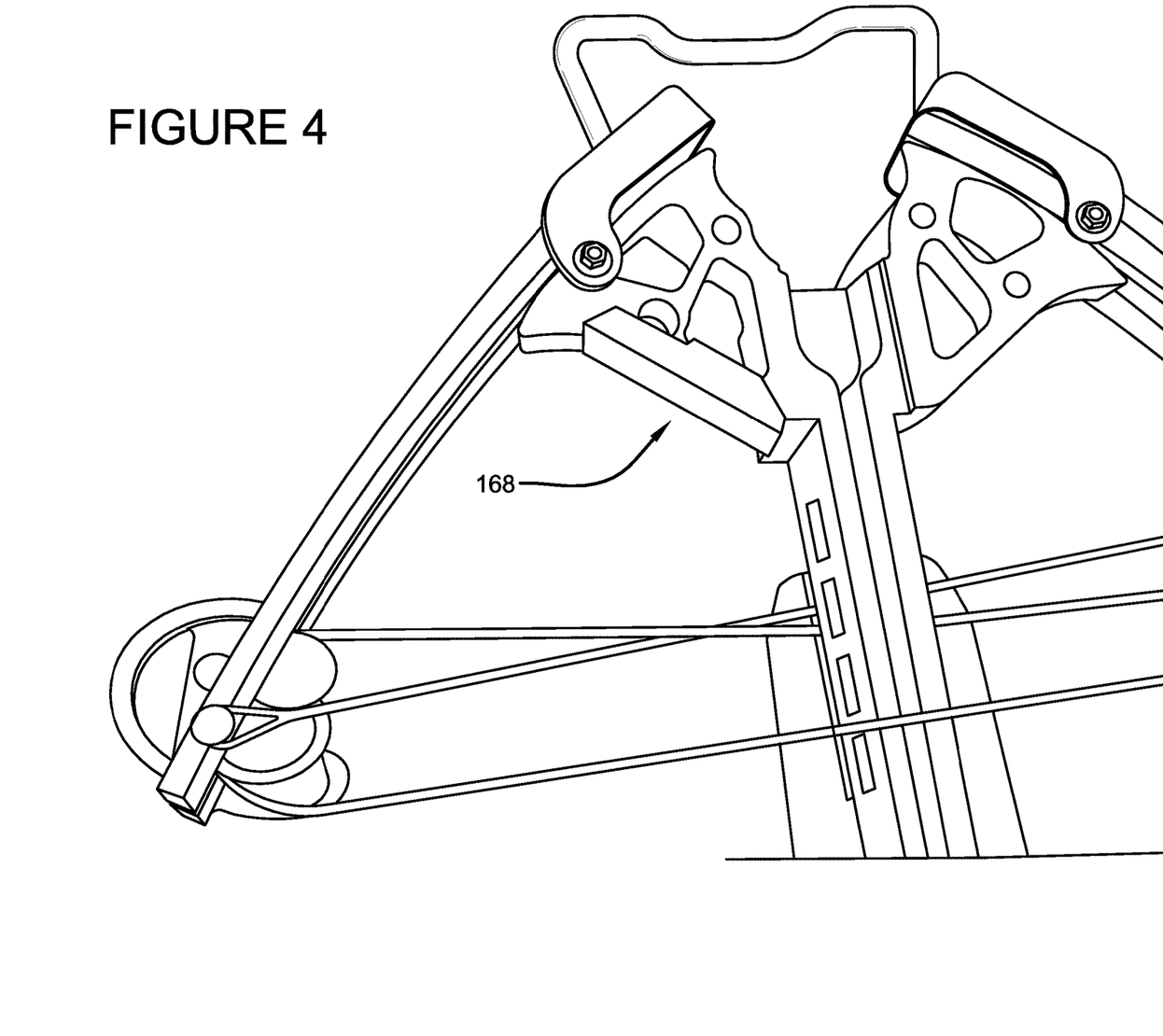
FIG. 4 is a perspective view of one embodiment of a crossbow safety system.
Figure 5:
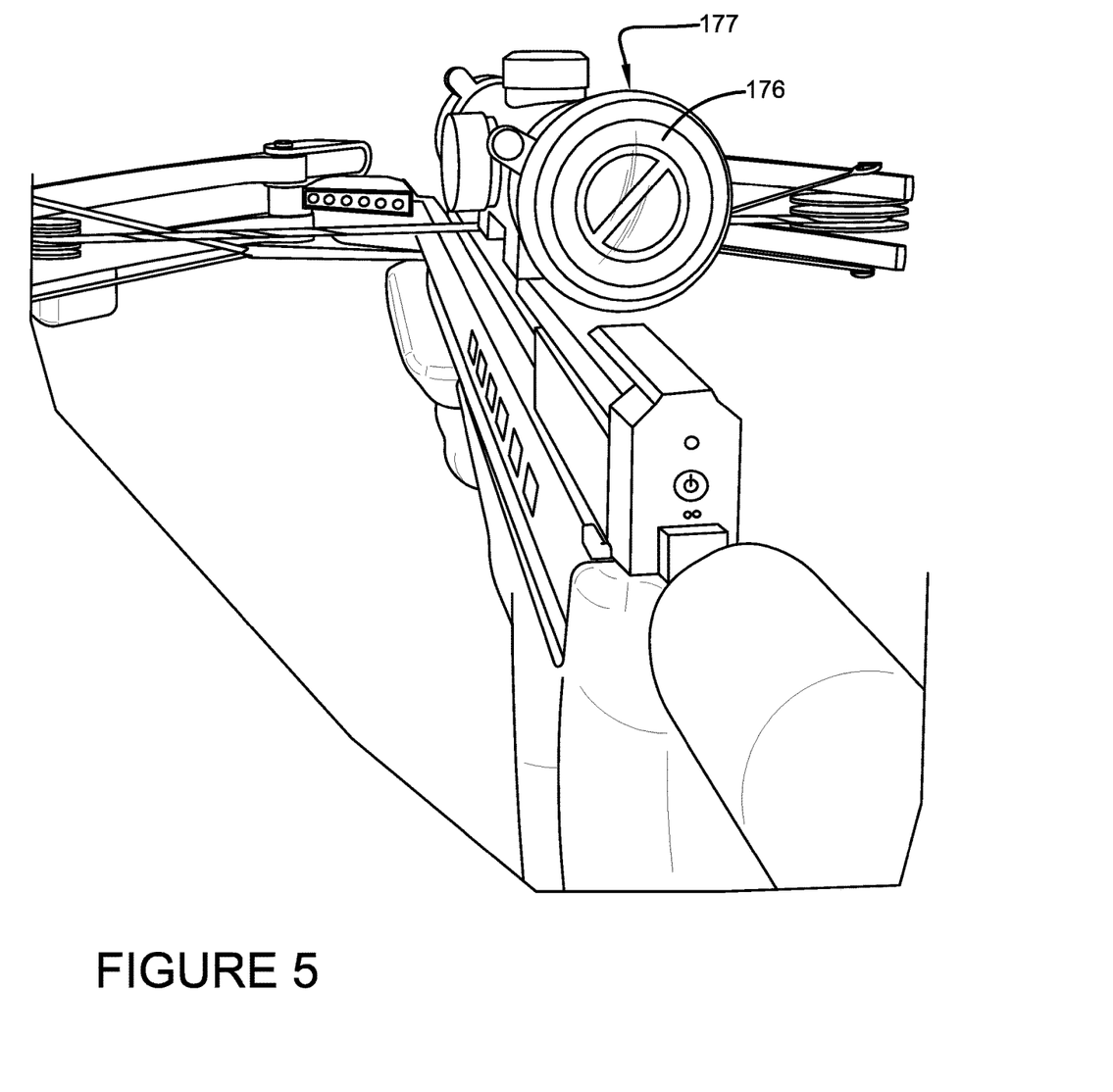
FIG. 5 is a perspective view of one embodiment of a crossbow safety system.

Referring now to the drawings wherein the showings are for purposes of illustrating embodiments of the present subject matter only and not for purposes of limiting the same, and wherein like reference numerals are understood to refer to like components, provided is a crossbow safety system and a method for using same.

In a first embodiment, a crossbow safety system 100 may comprise a crossbow 120, an optic fence 160, and an interlock 180.

The crossbow 120 may comprise a bowstring 122, and a trigger assembly 130. The bowstring 122 may be operable between a cocked position 123 and an uncocked position 124. The cocked position 123 and the uncocked position 124 define between them a bowstring plane 125. The bowstring plane 125 is the region through which the bowstring passes as it transitions from the cocked position 123 to the uncocked position 124. The bowstring sweeps through the bowstring plane 125 as it transitions from the cocked position 123 to the uncocked position 124. In one non-limiting embodiment, the bowstring 122 extends between a set of crossbow limbs 138, 139 and may be moved between the cocked position 123 and the uncocked position 124 by moving a section of the bowstring 122 along the beam 140. The trigger assembly 130 may be adapted to selectably retain the bowstring 122 in the cocked position 123. The crossbow is discharged, and any associated arrow operatively engaged with the bowstring 122 is fired, by triggering the crossbow 120. This triggering may also be called a firing operation. Triggering the crossbow 120 causes the trigger assembly 130 to release the bowstring 122 from the cocked position 123. The crossbow 120 may have a foregrip 126. A foregrip is adapted to be grasped by an associated hand of an associated user during operation. One common use of the foregrip 126 is to support the crossbow during a firing operation.

The optic fence 160 is a photosensitive array operating in a safety plane 162 either coincident with the bowstring plane 125 or offset below the bowstring plane 125 by some offset distance. A plane in which the optic fence 160 operates may be referred to as a safety plane 162. The optic fence 160 is adapted to detect an obstruction in a safety plane 162. Without limitation, there may be more than one safety plane 162 in some non-limiting embodiments. It is not critical that the safety plane 162 be parallel with the bowstring plane 125: it may be parallel with the bowstring plane 125 in some non-limiting embodiments and may be non-parallel with the bowstring plane 125 in some other non-limiting embodiments. In certain embodiments, the safety plane 162 is positioned between a space that is safe for a the hand of a user or fingers of a user or other body parts of a user, and the space containing the bowstring plane 125 so that if the user accidentally has his hand or finger or other body part in the space containing the bowstring plane 125 during an attempted firing operation, the user will also obstruct the safety plane 162 such that the interlock functionality as described below results.

The optic fence 160 may have an emitter 164 adapted to output electromagnetic radiation, and a photodiode 166 adapted to sense the radiation output from the emitter 164. In some non-limiting embodiments, the emitter 164 may be adapted to output: infrared (IR) radiation of one or more wavelengths in the range from 2000 nm to 700 nm; light of one or more wavelengths in the range from less than 700 nm to 400 nm; or ultraviolet radiation of one or more wavelengths in the range from less than 400 nm to 300 nm. In some non-limiting embodiments, the emitter 164 may be an LED or other type of IR source chosen with good engineering judgment. In some non-limiting embodiments, the emitter 164 may be a 940 nm wavelength LED adapted to output IR radiation. In some non-limiting embodiments, the photodiode 166 may be sensitive to: infrared (IR) radiation of one or more wavelengths in the range from 2000 nm to 700 nm; light of one or more wavelengths in the range from less than 700 nm to 400 nm; or ultraviolet radiation of one or more wavelengths in the range from less than 400 nm to 300 nm. In some non-limiting embodiments the photodiode 166 is sensitive to all or part of the wavelength range from 350 nm to 1100 nm. In some non-limiting embodiments the photodiode 166 has a peak sensitivity in the wavelength range from 960 nm to 1000 nm. In some non-limiting embodiments the optic fence 160 may comprise a reflector 168 adapted to reflect the electromagnetic radiation output by the emitter 164 from the reflector 168 and to the photodiode 166. In some non-limiting embodiments the reflector 168 may be adapted to reflect output IR radiation from the infrared emitter 164 to the photodiode 166. An obstruction of the safety plane may block the electromagnetic radiation output by the emitter 164 and prevent it from being properly received by the photodiode 166. If the electromagnetic radiation output by the emitter 164 is properly received by the photodiode 166 then the optic fence 160 will detect a clear safety plane 162 and may output a signal indicating that the safety plane 162 is not obstructed or may fail to output a signal indicating that the safety plane 162 is obstructed. If the electromagnetic radiation output by the emitter 164 is not properly received by the photodiode 166 then the optic fence 160 will not detect a clear safety plane 162 may output a signal indicating that the safety plane 162 is obstructed or may fail to output a signal indicating that the safety plane 162 is unobstructed. A computer, such as computer 190 or a computer in an operatively engaged associated device, may be used to compare the electromagnetic radiation output by the emitter 164 and the electromagnetic radiation received by the photodiode 166 to determine if the electromagnetic radiation output by the emitter 164 is properly received by the photodiode 166.

The optic fence 160 may comprise one or more of a power source, power cord 172, a power switch 173, a battery indicator light 174, an external warning indicator light 175, a scope display 176. A power source for an optic fence may comprise a battery or any source of electrical power chosen with good engineering judgment. The power source provides electrical power sufficient to run the emitter 164, the photodiode 166, and any other components of the optic fence 160. The power cord 172 is a wire or cable or other electrical conductor that is operatively engaged to conduct electrical power between the power source and other components of the optic fence 160. The power switch 173 may allow an associated user to selectably turn the power source on or off. A battery indicator light 174 may provide output to a user indicating the condition of a battery such as battery charge remaining. An external warning indicator light 175 may be used to indicate to an associated user obstruction of the safety plane 162. A scope display 176 may be used to indicate to an associated user obstruction of the safety plane 162. A scope display 176 may show an indication as a projection within the view through a scope 177.

In some non-limiting embodiments, the optic fence 160 may be operationally engaged with a computer 190. In some non-limiting embodiments, the computer 190 may be a cellular phone, or tablet, or other device. The operational engagement between the optic fence 160 and the computer 190 may be by any Bluetooth, infrared, radio signal, or any other wired or wireless communication device 193 or method adapted to operationally interface the optic fence 160 and the computer 190 chosen with good engineering judgment. In some non-limiting embodiments, the system 100 comprises a communication device 193 adapted to operationally interface with an associated cellular phone 195 to transmit data to, and receive data from, the associated cellular phone 195. In some non-limiting embodiments, the system 100 comprises a communication device 193 adapted to operationally interface with an associated cellular phone 195 which may act as a computer usable by the system 100; in such embodiments the associated cellular phone 195 may perform one or more of the computer functions that could otherwise be performed by computer 190, or the associated cellular phone 195, which by its nature comprises a type of computer itself, may replace or be the computer 190. In some embodiments the computer 190 or associated cellular phone 195 may have access to information about the system 100, from GPS or other sensors chosen with good engineering judgment, including, but not limited to, conditions such as cocked or uncocked status, loaded or unloaded status, user identification, time, location, orientation, light conditions, an event log, obstruction of the safety plane, lack of obstruction of the safety plane, or combinations thereof. Where the system is capable of gathering information about location and orientation, the system may permit triangulation or other calculations to be performed in order to provide estimate of ranges or other distances.

In some non-limiting embodiments the system 100 may comprise pulse signal generator 196 or a pulse signal reader 198, or both. In some non-limiting embodiments the optic fence 160 or components thereof, such as emitter 164 or photodiode 166, may be part of or may be operationally engaged with a pulse signal generator 196 or a pulse signal reader 198, or both. In some non-limiting embodiments, the emitter 164 may part of a pulse signal generator 196 adapted to send information, such as, and without limitation, information about the system 100 as described above, encoded as IR pulses or other electromagnetic pulses. In some non-limiting embodiments, the photodiode 166 may part of a pulse signal reader 198 adapted to receive information encoded as IR pulses or other electromagnetic pulses. A computer 190 or associated cell phone 195 may provide a signal to a pulse signal generator 196 comprising emitter 164 which causes it to emit a pulsed electromagnetic signal encoding information. A pulse signal reader 198 comprising a photodiode 166 may receive a pulsed electromagnetic signal encoding information and provide to a computer 190 or associated cell phone 195 a signal representative of the pulsed electromagnetic signal encoding information. The computer 190 or associated cell phone 195 may in turn decode the encoded information in the signal representative of the pulsed electromagnetic signal encoding information. Without limitation in embodiments in which the photodiode 166 is sensitive to IR, the photodiode 166 may be part of a pulse signal reader 198 adapted to receive information encoded as IR pulses. Without limitation in embodiments in which the emitter 164 is an IR emitter 164, the infrared emitter 164 may be part of a pulse signal generator adapted to send information encoded as IR pulses. A system 100 equipped with a pulse signal generator 196 and a pulse signal reader may communicate information about the system 100 with other similarly equipped systems.

The interlock 180 is operationally engaged with the optic fence 160 and the trigger assembly 130. In some embodiments, the interlock 180 is adapted to lock the trigger assembly 130 from releasing the bowstring 122 if the optic fence 160 does not detect a clear safety plane 162. In some embodiments, the interlock 180 is adapted to lock the trigger assembly 130 from releasing the bowstring 122 if the optic fence 160 detect an obstruction of the safety plane 162. In certain embodiments, the interlock 180 will lock the trigger assembly 130 from releasing the bowstring 122 unless it receives a release signal 186 from the computer 190 to release the interlock 180 and the computer 190 will only provide the release signal 186 to the interlock 180 if the optic fence 160 detects a clear safety plane 162. In certain embodiments, the interlock 180 will lock the trigger assembly 130 from releasing the bowstring 122 unless it receives a release signal 186 from the computer 190 to release the interlock 180 and the computer 190 will only provide the release signal 186 to the interlock 180 if the optic fence 160 does not detect an obstructed safety plane.

In operation, a crossbow safety system 100 may be operated by providing a crossbow safety system 100 as described above; using the optic fence to detect for an obstruction in the safety plane by emitting IR radiation from the infrared emitter and using the photodiode to sense for any IR radiation; comparing the electromagnetic radiation output by the emitter 164 and the electromagnetic radiation received by the photodiode 166 to determine if the electromagnetic radiation output by the emitter 164 is properly received by the photodiode 166, where this latter comparison operation may comprise comparing the IR radiation emitted from the infrared emitter to any IR radiation sensed by the photodiode; and operating the interlock wherein operation of the interlock locks the trigger assembly from releasing the bowstring if the optic fence does not detect a clear safety plane, or operation of the interlock unlocks the trigger assembly to permit release of the bowstring if the optic fence detects a clear safety plane.

Operation of the crossbow safety system may further comprise operationally engaging the optic fence with a computer and using the computer to compare the IR radiation emitted from the infrared emitter to any IR radiation sensed by the photodiode.

Operation of the crossbow safety system may further comprise operationally interfacing the system with an associated cellular phone; transmitting data to the associated cellular phone; and receiving data from the associated cellular phone.

Operation of the crossbow safety system may further comprise providing a reflector adapted to reflect output IR radiation from the infrared emitter to the photodiode; and reflecting output IR radiation from the infrared emitter to the photodiode with the reflector.

Non-limiting embodiments have been described, hereinabove. It will be apparent to those skilled in the art that the above methods and apparatuses may incorporate changes and modifications without departing from the general scope of the present subject matter. It is intended to include all such modifications and alterations in so far as they come within the scope of the appended claims or the equivalents thereof.

Having thus described the invention, it is now claimed:

We claim:
1. A crossbow safety system comprising:
   a crossbow having
      a bowstring operable between a cocked and an uncocked position, the cocked position and the uncocked position defining between them a bowstring plane, and
      a trigger assembly adapted to selectably retain the bowstring in the cocked position;
   an optic fence adapted to detect an obstruction in a safety plane coincident with the bowstring plane or offset below the bowstring plane by some offset distance, the optic fence having
      an emitter adapted to output electromagnetic radiation,
      a receiver adapted to sense the output electromagnetic radiation from the emitter; and
   an interlock
      operationally engaged with the optic fence and the trigger assembly, and
      adapted to lock the trigger assembly from releasing the bowstring if the optic fence
   does not detect a clear safety plane.

2. The crossbow safety system of claim 1, wherein the emitter is an LED.

3. The crossbow safety system of claim 2, wherein the emitter is a 940 nm wavelength LED.

4. The crossbow safety system of claim 1, wherein the receiver is a photodiode.

5. The crossbow safety system of claim 4, wherein the photodiode:
   is sensitive to all or part of the wavelength range from 350 nm to 1100 nm; and
   has a peak sensitivity in the wavelength range from 960 nm to 1000 nm.

6. The crossbow safety system of claim 1, wherein the optic fence is operationally engaged with a computer.

7. The crossbow safety system of claim 1, wherein the system comprises a communication device adapted to operationally interface with an associated cellular phone to transmit data to, and receive data from, the associated cellular phone.

8. The crossbow safety system of claim 1, wherein the emitter is part of a pulse signal generator adapted to send information encoded as electromagnetic pulses.

9. The crossbow safety system of claim 8, wherein the receiver is part of a pulse signal reader adapted to receive information encoded as electromagnetic pulses.

10. The crossbow safety system of claim 1, wherein the optic fence further comprises a reflector adapted to reflect output electromagnetic radiation from the emitter to the receiver.

11. A method of operating a crossbow safety system comprising:
   providing a crossbow safety system having
      a crossbow having
         a bowstring operable between a cocked and an uncocked position, the cocked position and the uncocked position defining between them a bowstring plane, and
         a trigger assembly adapted to selectably retain the bowstring in the cocked position,
      an optic fence adapted to detect for an obstruction in a safety plane coincident with the bowstring plane or offset below the bowstring plane by some offset distance, the optic fence having
         an emitter adapted to output electromagnetic radiation,
         a receiver adapted to sense the output electromagnetic radiation from the emitter, and
      an interlock operationally engaged with the optic fence and the trigger assembly, and adapted to lock the trigger assembly from releasing the bowstring if the optic fence detects an obstruction in the safety plane;

using the optic fence to detect for an obstruction in the safety plane by emitting electromagnetic radiation from the emitter and using the receiver to sense for any emitted electromagnetic radiation;

comparing the electromagnetic radiation emitted from the emitter to any electromagnetic radiation sensed by the receiver;

operating the interlock wherein operation of the interlock locks the trigger assembly from releasing the bowstring if the optic fence to does not detect a clear safety plane, or operation of the interlock unlocks the trigger assembly to permit release of the bowstring if the optic fence detects a clear safety plane.

12. The method of operating a crossbow safety system of claim 11, further comprising:

operationally engaging the optic fence with a computer; and using the computer to compare the electromagnetic radiation emitted from the emitter to any electromagnetic radiation sensed by the receiver.

13. The method of operating a crossbow safety system of claim 11, wherein the emitter is an LED.

14. The method of operating a crossbow safety system of claim 13, wherein the emitter emits radiation at a wavelength of 940 nm.

15. The method of operating a crossbow safety system of claim 11, wherein the receiver is a photodiode.

16. The method of operating a crossbow safety system of claim 15, wherein the photodiode:

is sensitive to all or part of the wavelength range from 350 nm to 1100 nm; and has a peak sensitivity in the wavelength range from 960 nm to 1000 nm.

17. The method of operating a crossbow safety system of claim 11, further comprising:

operationally interfacing the system with an associated cellular phone;

transmitting data to the associated cellular phone; and receiving data from the associated cellular phone.

18. The method of operating a crossbow safety system of claim 11, wherein the emitter is part of a pulse signal generator adapted to send information encoded as electromagnetic pulses; and wherein the receiver is part of a pulse signal reader adapted to receive information encoded as electromagnetic pulses.

19. The method of operating a crossbow safety system of claim 11, further comprising:

providing a reflector adapted to reflect output electromagnetic radiation from the emitter to the receiver; and reflecting output electromagnetic radiation from the emitter to the receiver with the reflector.

20. A crossbow safety system comprising:

a crossbow having a bowstring operable between a cocked and an uncocked position, the cocked position and the uncocked position defining between them a bowstring plane, and a trigger assembly adapted to selectably retain the bowstring in the cocked position;

an optic fence adapted to detect an obstruction in a safety plane offset below the bowstring plane, the optic fence having an emitter adapted to output electromagnetic radiation, the emitter being part of a pulse signal generator adapted to send information encoded as electromagnetic pulses, a receiver adapted to sense the output electromagnetic radiation from the emitter, a photodiode the photodiode being part of a pulse signal reader adapted to receive information encoded as electromagnetic pulses, and a reflector adapted to reflect output electromagnetic radiation from the emitter to the receiver;

a communication device adapted to operationally interface with an associated cellular phone to transmit data to, and receive data from, the associated cellular phone, the associated cellular phone comprising a computer; and an interlock operationally engaged with the optic fence and the trigger assembly, and adapted to lock the trigger assembly from releasing the bowstring if the optic fence does not detect a clear safety plane.

* * * * *